US008844676B2

(12) United States Patent
Filkowski

(10) Patent No.: US 8,844,676 B2
(45) Date of Patent: Sep. 30, 2014

(54) OPTIONALLY EXTENDABLE, RUNGED TIRE-MOUNT PLATFORM DEVICE

(76) Inventor: Kim Carl Filkowski, Clatsaknie, OR (US)

( * ) Notice: Subject to any disclaimer, the term of this patent is extended or adjusted under 35 U.S.C. 154(b) by 0 days.

(21) Appl. No.: 13/454,770

(22) Filed: Apr. 24, 2012

(65) Prior Publication Data

US 2012/0279802 A1 Nov. 8, 2012

Related U.S. Application Data

(60) Provisional application No. 61/518,229, filed on May 2, 2011, provisional application No. 61/505,275, filed on Jul. 7, 2011.

(51) Int. Cl.

| | |
|---|---|
| ***B60R 3/00*** | (2006.01) |
| ***E06C 5/24*** | (2006.01) |
| ***E06C 1/12*** | (2006.01) |
| ***E06C 5/04*** | (2006.01) |

(52) U.S. Cl.

CPC ... *E06C 5/24* (2013.01); *E06C 1/12* (2013.01); *E06C 5/04* (2013.01)

USPC ............. 182/206; 182/127; 182/115; 182/83; 280/165

(58) Field of Classification Search

USPC ........... 182/150, 206, 120, 201, 204, 84, 207, 182/127, 83, 187, 188, 115, 116, 129, 182/107–109; 280/165, 166

See application file for complete search history.

(56) References Cited

U.S. PATENT DOCUMENTS

| | | | | | |
|---|---|---|---|---|---|
| 2,679,436 | A * | 5/1954 | Viebrock et al. | .............. | 182/150 |
| 2,772,720 | A * | 12/1956 | Zody et al. | ................. | 248/205.1 |
| 2,848,150 | A * | 8/1958 | Tans | .............................. | 182/150 |
| 2,969,123 | A * | 1/1961 | Jamerson et al. | ............. | 182/116 |
| 2,975,857 | A * | 3/1961 | Hyman et al. | ................ | 182/166 |
| 3,260,329 | A * | 7/1966 | Zevely | .......................... | 182/202 |
| 3,593,821 | A * | 7/1971 | Lister | ............................ | 182/115 |
| 4,264,084 | A * | 4/1981 | Telles | ............................ | 280/166 |
| 4,586,585 | A * | 5/1986 | Zaner | .............................. | 182/97 |
| 4,614,252 | A * | 9/1986 | Tarner | ........................... | 182/116 |
| 4,947,961 | A * | 8/1990 | Dudley | ........................... | 182/92 |
| 5,009,283 | A * | 4/1991 | Prejean | ......................... | 182/116 |
| 5,105,908 | A * | 4/1992 | Freund | ............................ | 182/20 |
| 5,282,520 | A * | 2/1994 | Walker | .......................... | 182/116 |
| 5,295,556 | A * | 3/1994 | Mullin | .......................... | 182/187 |
| 5,590,738 | A * | 1/1997 | Hunt et al. | .................... | 182/116 |
| 5,791,436 | A * | 8/1998 | Talley, Sr. | ..................... | 182/116 |
| 6,283,496 | B1 * | 9/2001 | Dickmann | .................... | 280/652 |
| 6,401,861 | B1 * | 6/2002 | Marszalek | ...................... | 182/84 |

(Continued)

OTHER PUBLICATIONS

First definition of "scallop" found in Action The American Heritage® Dictionary of the English Language, Fourth Edition copyright © 2000 by Houghton Mifflin Company. Updated in 2009. Published by Houghton Mifflin Company. All rights reserved.*

(Continued)

*Primary Examiner* — Daniel Cahn
(74) *Attorney, Agent, or Firm* — Mersenne Law LLP

(57) ABSTRACT

A ladder-like access device is suited for securing to a tire of a vehicle by way of a strap, rope, chain, cable or similar structure. The device may include extendable legs to adapt its length to a range of wheel and tire sizes. A variety of structures, materials and construction methods are described and claimed.

8 Claims, 6 Drawing Sheets

(56) References Cited

U.S. PATENT DOCUMENTS

| | | | | |
|---|---|---|---|---|
| 6,422,344 | B1 * | 7/2002 | Cox | 182/163 |
| 6,550,578 | B1 * | 4/2003 | Law et al. | 182/150 |
| 7,168,521 | B1 * | 1/2007 | Murray | 182/127 |
| 8,074,768 | B2 * | 12/2011 | Rund | 182/86 |
| 8,322,490 | B1 * | 12/2012 | Loemker | 182/127 |
| 2005/0077505 | A1 * | 4/2005 | Thurm | 254/89 H |
| 2005/0082326 | A1 * | 4/2005 | Badillo | 224/326 |
| 2006/0272896 | A1 * | 12/2006 | Rajewski | 182/127 |
| 2007/0187921 | A1 * | 8/2007 | Seely et al. | 280/165 |
| 2008/0084044 | A1 * | 4/2008 | Dietelbach | 280/165 |
| 2008/0128204 | A1 * | 6/2008 | Engstrom | 182/116 |
| 2010/0065372 | A1 * | 3/2010 | Holcombe | 182/188 |
| 2010/0122871 | A1 * | 5/2010 | Gottlinger | 182/106 |

OTHER PUBLICATIONS

2nd definition of "scallop" found in Action Collins English Dictionary—Complete and Unabridged © HarperCollins Publishers 1991, 1994, 1998, 2000, 2003.*

* cited by examiner

OPTIONALLY EXTENDABLE, RUNGED TIRE-MOUNT PLATFORM DEVICE

CONTINUITY AND CLAIM OF PRIORITY

This U.S. patent application claims the benefit of provisional application No. 61/518,229 filed 2 May 2011 and provisional application No. 61/505,275 filed 7 Jul. 2011.

FIELD

The invention relates to access or work platforms that may be removably mounted to a vehicle, to provide improved access to the engine, windows or roof of such vehicles.

BACKGROUND

The prior art includes several different tire mount platform devices. Examples include those disclosed in U.S. Pat. Nos. 2,575,503; 2,848,150; 2,851,312; 2,973,052; 4,947,961; 5,133,429; 6,044,928; and 6,550,578; the disclosures of which are incorporated by reference. Clearly, the general idea of mounting a work or access platform to a vehicle tire is known.

Problems with prior-art wheel-mounting platform devices, however, include that many offer only a single step or platform, thus limiting or restricting access (e.g., ascending to the engine compartment/hood area) and usability on different-sized vehicles. In the prior art embodiments that include more than one step, only two steps are provided and they are arranged substantially vertically. It is more difficult to climb vertically-disposed steps than steps mounted diagonally, and vertical steps offer less flexible access when loading, securing or unloading cargo from a roof of a vehicle.

Furthermore, when climbing vertically-arranged steps, one may be forced to use one hand to hold on to the vehicle if the vehicle body bulges out beyond the tire. A different step orientation may alleviate this requirement, freeing both the user's hands to carry tools, supplies, a light, beverage or the like as he mounts the steps.

Another shortcoming of prior art tire mounting steps and/or platforms is that their height is of limited adjustability. Many such platforms simply hang from the top of the tire, so it may be difficult to step onto the platform when attached to very large tires, and it may be difficult to raise or lower heavy cargo when there is a tall step.

Yet another disadvantage of prior-art tire-mount platform devices is that many attach to the top of the wheel and simply dangle clown. If the vehicle does not have the parking brake set and for automatics, the transmission placed in "park," then the vehicle may accidentally roll. This results in the step(s) falling off the wheel, with a high chance of injury to the user.

An adjustable tire-mount access device that addresses these shortcomings may be of significant value in this field.

SUMMARY

Embodiments of the invention provide height-adjustable tire-mount platforms that offer improved access to upper portions of vehicles, such as engine compartments, windows, roofs, roof racks, and so on. Embodiments may be particularly useful on pickup trucks, vans, SUVs and service vehicles.

An extendable tire-mount device in accordance with the present invention may include one or more of extendable legs, diagonal positioning when mounted, a flexible and adjustable mounting harness, and a tire-side face on the platform that is concave or recessed to better fit the tire. The extendable legs may be rungless, merely extending the legs of the runged section; or may provide additional rungs to facilitate climbing.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention are generally similar to, and give the visual impression of, fixed or extendable stepladders, but all include a structure or component for securing the embodiment to a tire, so that a user can more easily access out-of-reach areas on a taller vehicle for cleaning, repair or storage manipulation.

Figure 1B:
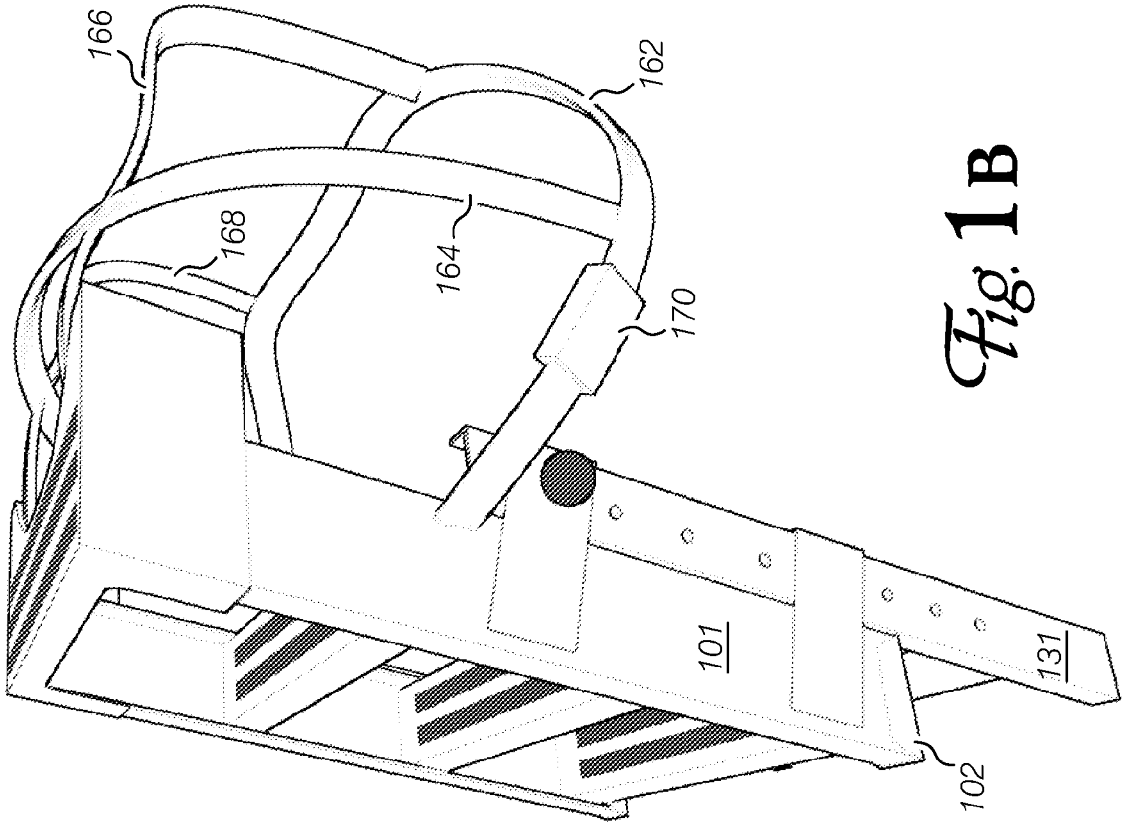
FIGS. 1A and 1B show views of an embodiment of the invention in collapsed and extended configurations.
Figure 1A:
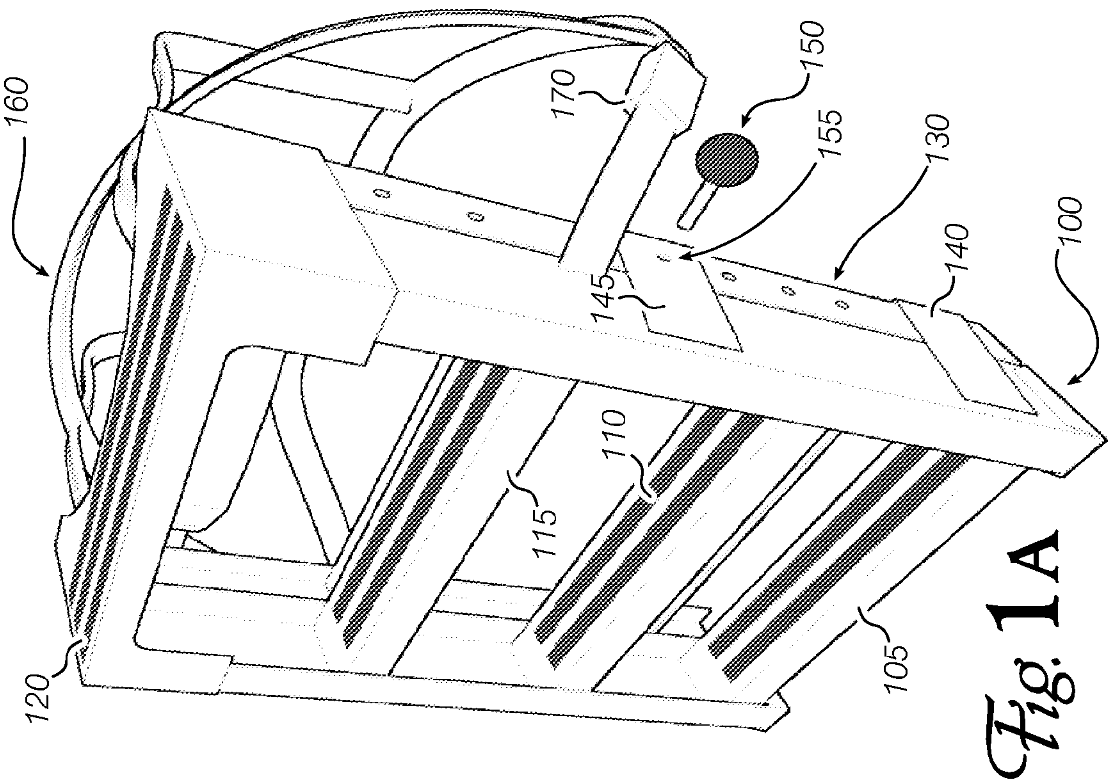

FIGS. 1A and 1B show two views of a first representative embodiment of the invention. In FIG. 1A, the "stepladder" portion of the embodiment is collapsed: a front portion 100 comprising three steps 105, 110, 115 and a top portion 120; is secured to a rear, extendable portion 130 by side-mounted rail guides 140 and 145. A locking pin 150 is shown near a hole in the frame 155; to lock the extendable portion at a desired position, the pin is inserted into the hole (a similar locking pin is provided on the other side of the embodiment, but it is not visible in this view). A web 160 is attached at several points to the ladder frame, and a buckle 170 allows adjustment of a portion of the web. The steps and top portion may be provided with anti-slip features such as the grit tape depicted as black stripes on each step.

FIG. 1B shows the same embodiment in an extended configuration: rear portion 130 has been released by withdrawing the locking pins, extended or slid down, and secured by re-inserting the pins. In this view, the right side rails 101 and 131 of front and rear portions 100 and 130 are identified. Either or both pairs of side rails may have a protective, anti-slip foot attached, as shown at 102. The web structure identified generally as 160 in FIG. 1A can be seen to comprise a number of straps 162, 164, 166 and 168, which may be sewn, riveted, or woven together, or connected using buckles or other conventional means. Buckle 170 permits adjustment of the size of circumferential loop 162.

Figure 2A:
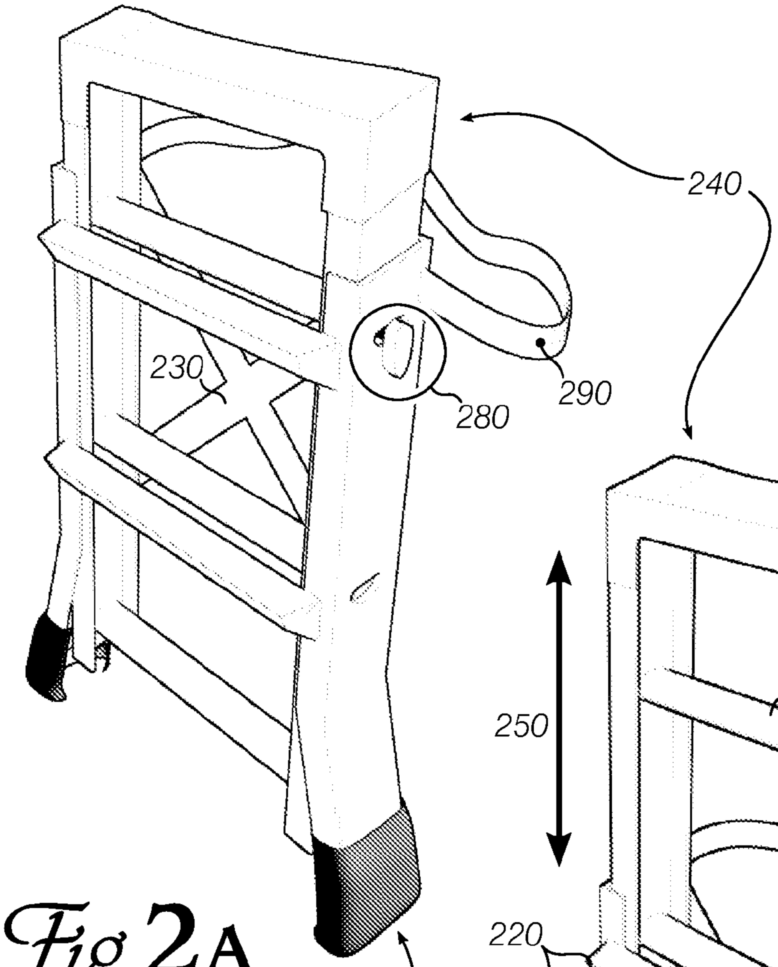
FIGS. 2A and 2B show views of another embodiment of the invention in collapsed and extended configurations.
Figure 2B:
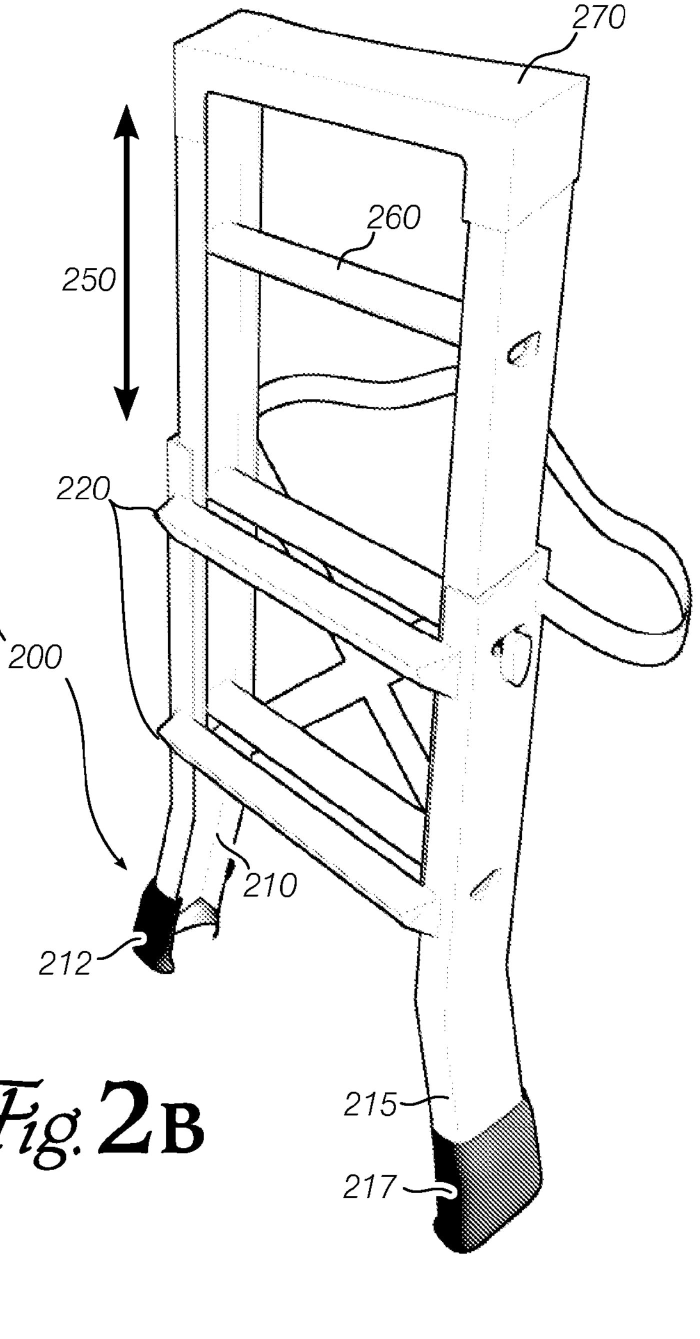

FIGS. 2A and 2B show another embodiment in collapsed and extended configurations. In this embodiment, a lower portion 200 surrounds an upper extendable portion 240, allowing the upper portion to slide up and clown (as suggested by arrow 250) when the locking mechanism at 280 is disengaged.

Lower portion 200 comprises side rails 210, 215; rungs 220 and a rear brace 230. The lower ends of rails 210 and 215 may be capped by anti-scratch, anti-slip feet 212 and 217. Upper portion 240 comprises side rails (not identified), rungs (one of which is identified as 260), and a top 270. This embodiment has a single securing strap identified as 290.

Figure 3:
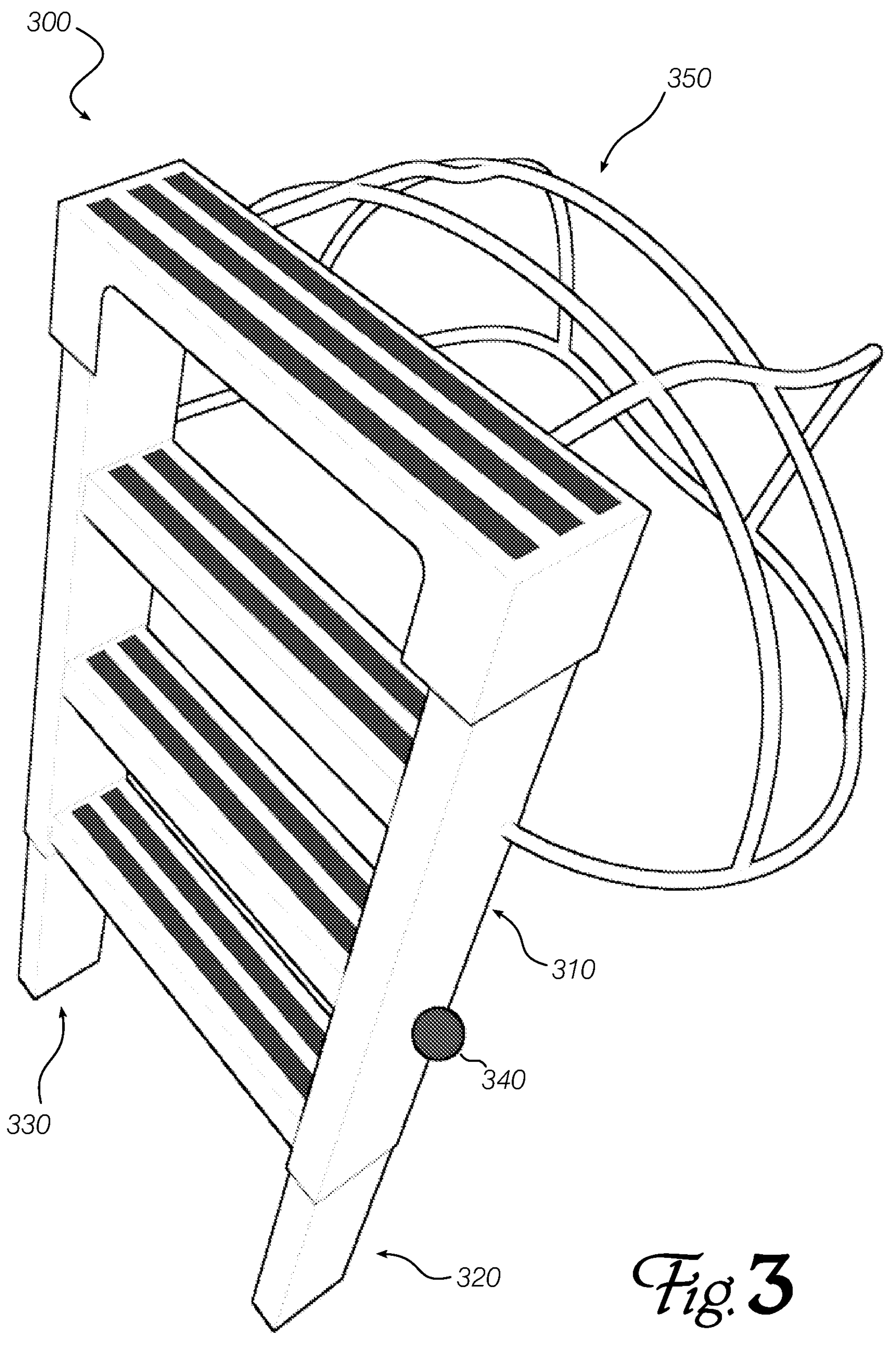
FIG. 3 shows a third embodiment of the invention.

FIG. 3 shows a third extendable embodiment 300, in the extended position only. Like the previous embodiments, this one is generally similar to a single-sided stepladder. The side rails of the upper portion 310 are hollow, square tubes, within which smaller tubes 320, 330 can slide. To raise or lower upper portion 310, the user can withdraw a locking pin connected to handle 340, adjust the sliding tube to the desired position, and reinsert the locking pin. In this embodiment, the securing web 350 is made from round, elastic cord ("bungee" or "shock cord"). The size and elasticity of the cord may be chosen so that more-complex locking or adjusting mechanisms are not necessary.

Embodiments of the invention are to be placed against and secured to the tire of a vehicle, to allow the user to climb the ladder safely and reach higher points on the vehicle. For example, an embodiment may be secured to the front tire of a front-engine truck to allow a mechanic to reach the engine bay more easily, or an embodiment may be secured to the rear tire of a van to allow the user to reach storage bins or luggage placed on the top of the vehicle.

Figure 4:
FIG. 4 shows a simplified structure to explain how the top step of an embodiment may be shaped to fit more securely to a vehicle tire.

FIG. 4 shows a simplified three-dimensional representation of a rectangular block 410 (representing the ladder structure of an embodiment) near a toroidal object 420 representing a tire. Block 410 and tire 420 have been separated slightly to expose a scalloped shaped area 450. The top step of an embodiment of the invention may be formed with a similar scallop-shaped profile, to improve the stability of the ladder when it is secured to the tire. The scallop-shaped depression helps keep the ladder from rocking back and forth against the tire, even if the lower ends are placed on an uneven or unstable surface.

Although the profile of the scallop-shaped indentation is difficult to describe in words, it is easy to compute using standard engineering computer-aided design ("CAD") tools. Furthermore, since embodiments may be used with a variety of tire sizes and at differing angles of lean against the tire, the precise size and shape of the scalloped indentation (including top profile 430 and side profile 440) is not critical. An embodiment may comprise scores, protrusions, lugs or the like (indicated generally at 460) to help keep the top step from sliding from side to side against the tire.

The complex shape of the top step of an embodiment can be manufactured easily by molding it of plastic, or with somewhat greater difficulty by forming it from sheet metal or cutting it from another material. In a preferred embodiment, the top step is molded from thermoplastic resin.

The ladder structure of an embodiment may be constructed of any conventional materials, using any conventional techniques. For example, side rails of the upper and/or lower parts may be made from fiberglass channels, aluminum channels, wood or another material. Rungs and braces may be fiberglass, metal or wood. Side rails and rungs may be joined by screws, rivets, glue, welding, or other techniques. Protective feet at the bottom of side rails may be plastic, rubber, or metal. Extension-locking mechanisms may be shear pins, as discussed above, or compression/friction fittings, ratchets or other structures.

An embodiment may sized to fit a range of tires, but generally, the width of an embodiment is preferably within about ±20% of the diameter of the applicable tire, and the length such that the embodiment can be leaned against the tire at an angle from about 45° to about 80° from the horizontal. (This implies a ladder length from slightly longer than the tire diameter to almost 1.5 times the tire diameter. Of course, an extendable embodiment may be suitable for use with a wider range of tire sizes.) Narrower ladders may provide inferior access for the user, while vehicle fenders or wheel wells may interfere with wider ladders. Very short ladders are not much use, whereas overly long ladders may be inconvenient to transport, or may be more difficult to secure to the tire.

Figure 5:
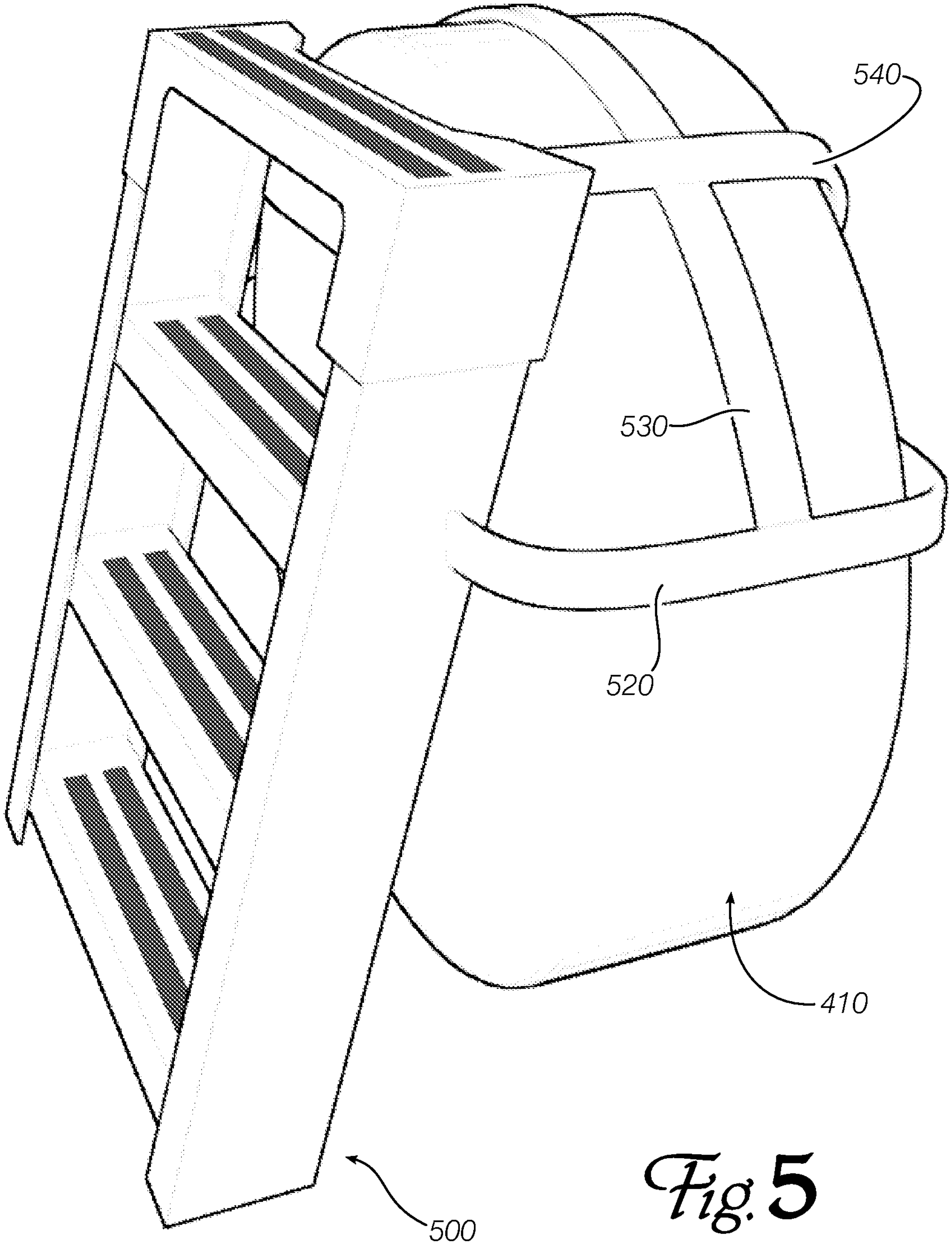
FIG. 5 shows a non-extendable embodiment secured to a tire.

FIG. 5 shows a non-extendable embodiment 500 secured to a tire 410 using a multi-strap web, with a circumferential strap 520, a coronal strap 530, and an auxiliary positioning strap 540. (This embodiment comprises at least one more auxiliary positioning strap, but it is not visible in this view.) An embodiment may use buckles, friction fittings, or other rope/cord/strap-length adjustment mechanisms to set the securing-web size appropriately for the tire to which the embodiment is secured.

The strap or web to secure an embodiment to a tire may be made of nylon webbing, rope, chain, metal cable, elastic bands or cords, or combinations of such materials. It is preferred that the main horizontal securement strap pass around the tire above the horizontal centerline of the wheel (to avoid the axle, brake mechanisms, etc.) and below about 75% of the diameter of the tire. If the horizontal strap is too high, it may tend to slide further up to the top of the tire, thus impairing the secure attachment. However, it is appreciated that tire-tread features (e.g., side traction lugs) may help keep the strap in place. Other parts of the securing web (e.g., coronal and auxiliary positioning straps) may be placed to provide easy access to length adjusters and/or suit single or double-tire wheels. In some embodiments, the securing web may be constructed of fabric in a half-wheel-cover configuration. The lower edge of such a half wheel cover is similar in positioning and purpose to the main horizontal strap of other embodiments.

Figure 6:
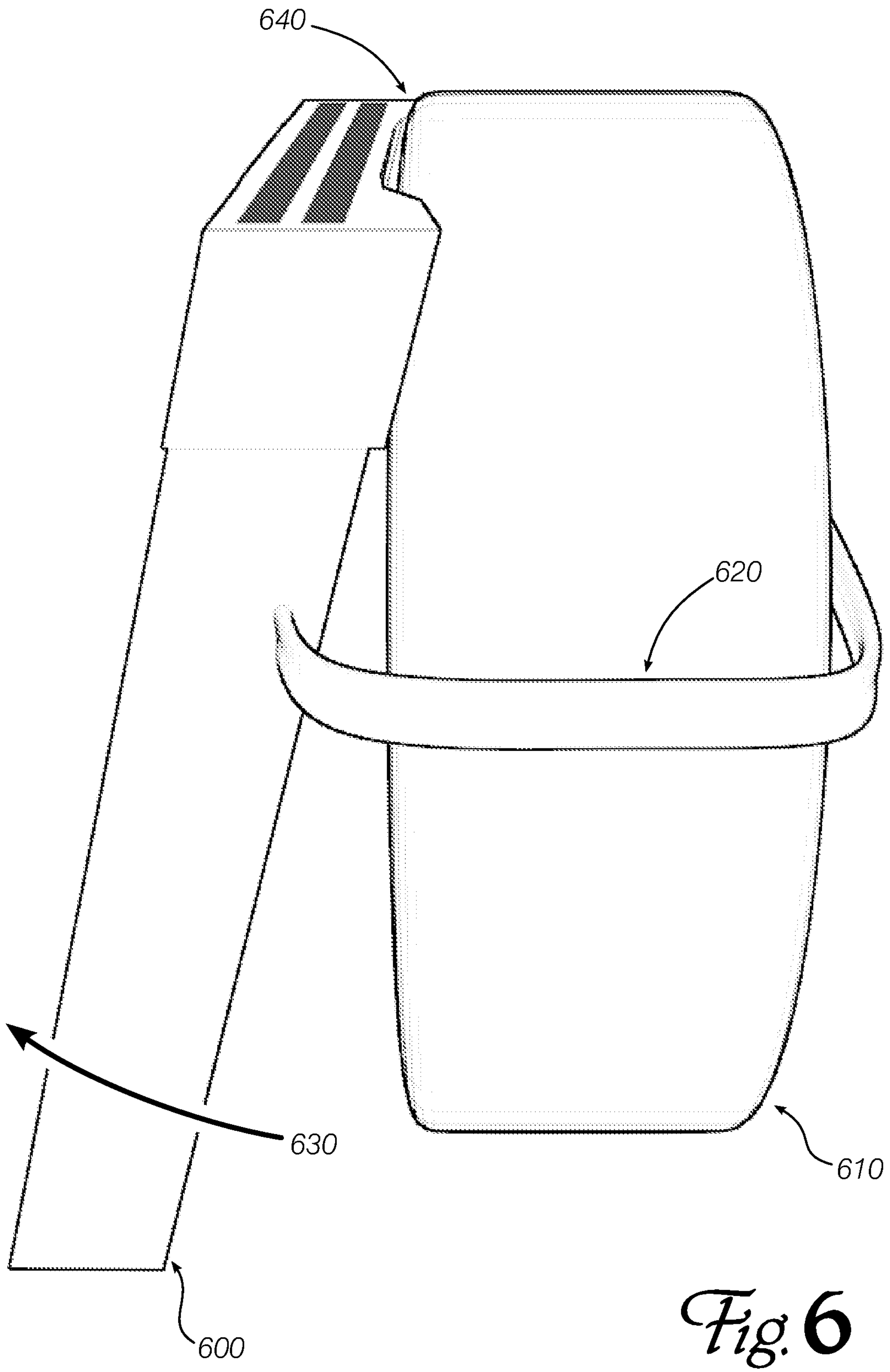
FIG. 6 shows another non-extendable embodiment with an alternate method of securement.

FIG. 6 shows another view of a non-extendable embodiment 600 which uses a single strap 620 to secure it to tire 610. Strap 620 may have a length adjustment mechanism (not shown), but for final attachment, the bottom end of the embodiment may simply be pulled away from the tire as shown by arrow 630. This will tighten strap 620 and lever the top of the embodiment against the top of the tire at 640. In this Figure, the scalloped shape of the top of the embodiment and its relationship with the top of the tire are clearly visible.

Several specific embodiments of the present invention have been described with reference to corresponding Figures. However, those of skill in the art will recognize that changes in materials and configurations may be made without departing from the general principles of the invention. Such changes and alternate implementations are understood to be captured according to the following claims.

I claim:

1. A secured step platform to be attached to a tire of a vehicle, the platform comprising:

a ladder structure including two rigid vertical uprights and three horizontal steps disposed substantially perpendicular to and between the two vertical uprights, wherein each of said two vertical uprights respectively forms a channel receiving ends of the three horizontal steps; and anti-slip feet attached at lower ends of the two vertical uprights; and a top step attached to and extending horizontally between a top of a first vertical upright of the two vertical uprights and a top of a second vertical upright of the two vertical uprights, said top step having an indentation forming an inner surface of an inner edge of said top step, said inner surface having a three dimensional concave contour, the inner surface further having protrusions configured to keep the top step from sliding against the tire, wherein said three dimensional concave contour of said inner surface is configured to match a shape of a sidewall and adjacent tread surface of the tire to securely rest the step platform at an angle against the sidewall of the tire when the tire is installed on the vehicle; and a securing structure including at least one length adjustable strap attached to and extending between the first vertical upright and the second vertical upright, a second strap attached to a first point of the at least one length adjustable strap, a first end of a third strap attached to the top step as a second end of the third strap is attached at a second point of the at least one length adjustable strap, wherein a major length of the third strap is further attached substantially perpendicularly to a major length of the second strap, the securing structure configured to secure the step platform to the tire by having the at least one length adjustable strap extend around a rear surface of the tire as the second strap extends parallel to and along an upper tread surface of the tire as the third strap extends over and perpendicular to the upper tread surface of the tire as the ladder structure is secured in position at the angle against the sidewall of the tire.

2. The secured step platform of claim 1, wherein the at least one length adjustable strap is two securing straps joined by a buckle, said buckle allowing adjustment of a length of the two securing straps.

3. The secured step platform of claim 1, wherein a location of the at least one length adjustable strap is configured to allow the at least one length adjustable strap to pass around the tire above a horizontal centerline of the tire and below about 75% of a height of the tire.

4. The secured step platform of claim 1, wherein the top step is molded from a plastic material.

5. The secured step platform of claim 1, wherein at least one of the straps is made of elastic material.

6. The secured step platform of claim 1, wherein at least one of the straps comprises a nylon strap.

7. The secured step platform of claim 1, wherein both of the two vertical uprights are formed of one material, said one material being fiberglass, aluminum, or wood.

8. The secured step platform of claim 1 wherein all of the three horizontal steps are formed of one material, said one material being one of aluminum, fiberglass or wood.

* * * * *